(12) United States Patent
Zinniel et al.

(10) Patent No.: US 10,670,019 B2
(45) Date of Patent: Jun. 2, 2020

(54) CONICAL VISCOSITY PUMP WITH AXIALLY POSITIONABLE IMPELLER AND METHOD OF PRINTING A 3D PART

(71) Applicant: Stratasys, Inc., Eden Prairie, MN (US)

(72) Inventors: Robert L. Zinniel, Plymouth, MN (US); J. Samuel Batchelder, Somers, NY (US)

(73) Assignee: STRATASYS, INC., Eden Prairie, MN (US)

(*) Notice: Subject to any disclaimer, the term of this patent is extended or adjusted under 35 U.S.C. 154(b) by 83 days.

(21) Appl. No.: 15/337,503

(22) Filed: Oct. 28, 2016

(65) Prior Publication Data

US 2017/0122322 A1   May 4, 2017

Related U.S. Application Data

(60) Provisional application No. 62/248,972, filed on Oct. 30, 2015, provisional application No. 62/248,963, filed on Oct. 30, 2015.

(51) Int. Cl.
*F04D 3/02* (2006.01)
*B33Y 10/00* (2015.01)
(Continued)

(52) U.S. Cl.
CPC ............... *F04D 3/02* (2013.01); *B22F 3/008* (2013.01); *B29C 48/02* (2019.02); *B29C 48/285* (2019.02);
(Continued)

(58) Field of Classification Search
CPC ... F04D 3/00; F04D 3/02; B29C 64/00; B29C 64/10; B29C 64/106; B29C 64/118;
(Continued)

(56) References Cited

U.S. PATENT DOCUMENTS

| 556,472 A | 3/1895 | Mccarroll |
| 1,533,309 A | 4/1925 | Durborow |

(Continued)

FOREIGN PATENT DOCUMENTS

| WO | 1999/037454 B1 | 7/1999 |
| WO | 1999/037456 B2 | 7/1999 |

(Continued)

OTHER PUBLICATIONS

Finke, S.; Feenstra, F.K.: "Solid Freeform Fabrication by Extrusion and Deposition of Semi-Solid Alloys". Journal of Materials Science, Kluwer Academic Publishers, BO. vol. 37, No. 15, Aug. 1, 2002, pp. 3101-3106.

(Continued)

*Primary Examiner* — Peter L Vajda
*Assistant Examiner* — S. Behrooz Ghorishi
(74) *Attorney, Agent, or Firm* — Westman, Champlin & Koehler, P.A.

(57) ABSTRACT

A pump assembly for use in an additive manufacturing system includes a viscosity pump having a first end and a second end wherein the first end has a cross sectional area greater than a cross sectional area of the second end. The viscosity pump has a conical shaped inner surface defining a pump chamber, an inlet proximate the first end and an outlet proximate the second end. The viscosity pump includes an impeller having an axis of rotation, where the impeller has a shaft positioned through the first end of the first housing and into the pump chamber. The impeller includes a distal tip-end at a distal end of the shaft wherein the impeller is configured to be axially displaced within the pump chamber of the viscosity pump parallel to the axis of rotation. An actuator is coupled to a proximal end of the impeller, wherein the actuator is configured to move the impeller parallel to the axis of rotation.

18 Claims, 7 Drawing Sheets

(51) Int. Cl.
  *B33Y 30/00*     (2015.01)
  *B33Y 50/02*     (2015.01)
  *B29C 48/285*    (2019.01)
  *B29C 64/20*     (2017.01)
  *B29C 64/386*    (2017.01)
  *B29C 64/106*    (2017.01)
  *B22F 3/00*      (2006.01)
  *B29C 48/395*    (2019.01)
  *B29C 48/02*     (2019.01)

(52) U.S. Cl.
  CPC .......... *B29C 48/395* (2019.02); *B29C 64/106* (2017.08); *B29C 64/20* (2017.08); *B29C 64/386* (2017.08); *B33Y 10/00* (2014.12); *B33Y 30/00* (2014.12); *B33Y 50/02* (2014.12); *B22F 2999/00* (2013.01); *B29C 2948/926* (2019.02); *B29C 2948/92104* (2019.02); *B29C 2948/92895* (2019.02); *B29C 2948/92904* (2019.02)

(58) Field of Classification Search
  CPC ..... B29C 64/20; B29C 47/00; B29C 47/0002; B29C 47/10; B29C 47/38; B29C 2947/00; B29C 2947/92104; B29C 2947/926; B29C 2947/92895; B29C 2947/92904; B29C 66/972; B22F 3/00; B22F 3/008; B33Y 10/00; B33Y 30/00; B33Y 50/00; B33Y 50/02; B33Y 70/00
  See application file for complete search history.

(56) References Cited

U.S. PATENT DOCUMENTS

| | | | |
|---|---|---|---|
| 2,207,405 A | 7/1940 | Jacobson | |
| 4,512,067 A * | 4/1985 | Kobayashi | G01F 23/263 29/25.41 |
| 4,749,347 A | 6/1988 | Valavaara | |
| 5,109,589 A | 5/1992 | Cramer et al. | |
| 5,121,329 A | 6/1992 | Crump | |
| 5,141,680 A | 8/1992 | Almquist et al. | |
| 5,167,138 A | 12/1992 | Sinha et al. | |
| 5,303,141 A | 4/1994 | Batchelder et al. | |
| 5,312,224 A | 5/1994 | Batchelder et al. | |
| 5,340,433 A | 8/1994 | Crump | |
| 5,342,664 A | 8/1994 | Drotloff et al. | |
| 5,406,969 A | 4/1995 | Gray et al. | |
| 5,503,785 A | 4/1996 | Crump et al. | |
| 5,572,431 A | 11/1996 | Brown et al. | |
| 5,622,216 A | 4/1997 | Brown | |
| 5,656,230 A | 8/1997 | Khoshevis | |
| 5,764,521 A | 6/1998 | Batchelder et al. | |
| 5,782,120 A | 7/1998 | Wright | |
| 5,816,466 A | 10/1998 | Seufer | |
| 5,866,058 A | 2/1999 | Batchelder et al. | |
| 5,900,207 A | 5/1999 | Danforth et al. | |
| 5,939,008 A | 8/1999 | Comb et al. | |
| 5,968,551 A | 10/1999 | Batchelder et al. | |
| 6,004,124 A | 12/1999 | Swanson et al. | |
| 6,022,207 A | 2/2000 | Dahlin et al. | |
| 6,027,326 A | 2/2000 | Cesaramp, III et al. | |
| 6,054,077 A | 4/2000 | Comb et al. | |
| 6,067,480 A | 5/2000 | Stuffle et al. | |
| 6,085,957 A | 7/2000 | Zinniel et al. | |
| 6,214,279 B1 | 4/2001 | Yang et al. | |
| 6,238,613 B1 | 5/2001 | Batchelder et al. | |
| 6,257,517 B1 | 7/2001 | Babish et al. | |
| 6,360,576 B1 | 3/2002 | Plata et al. | |
| 6,547,995 B1 | 4/2003 | Comb | |
| 6,578,596 B1 | 6/2003 | Batchelder et al. | |
| 6,637,250 B2 | 10/2003 | Plata et al. | |
| 6,722,872 B1 | 4/2004 | Swanson et al. | |
| 6,814,907 B1 | 11/2004 | Comb | |
| 7,026,574 B2 | 4/2006 | Belfiore et al. | |
| 7,168,935 B1 | 1/2007 | Taminger et al. | |
| 7,891,964 B2 * | 2/2011 | Skubic | B29C 64/106 264/113 |
| 7,942,987 B2 | 5/2011 | Crump et al. | |
| 7,977,599 B2 | 7/2011 | Adams | |
| 8,215,371 B2 | 7/2012 | Batchelder | |
| 8,245,757 B2 | 8/2012 | Crump et al. | |
| 2004/0188053 A1 | 9/2004 | Brice | |
| 2006/0045787 A1 | 3/2006 | Jandeska et al. | |
| 2007/0003656 A1 | 1/2007 | LaBossiere et al. | |
| 2007/0228590 A1 | 10/2007 | LaBossiere et al. | |
| 2008/0136066 A1 * | 6/2008 | Taylor | H05B 6/107 264/486 |
| 2009/0314391 A1 | 12/2009 | Crump et al. | |
| 2012/0161350 A1 * | 6/2012 | Swanson | B33Y 30/00 264/40.7 |
| 2016/0009029 A1 * | 1/2016 | Cohen | B29C 67/0085 264/493 |

FOREIGN PATENT DOCUMENTS

| | | | |
|---|---|---|---|
| WO | 2000/078519 B3 | 12/2000 | |
| WO | WO-2011092269 A2 * | 8/2011 | ......... B29C 47/0002 |

OTHER PUBLICATIONS

Cao, W.; Miyamoto, Y.: Freeform Fabrication of Aluminum Parts by Direct Deposition of Molten Aluminum. Journal of Materials Processing Technology, Elsevier, NL, vol. 173, No. 2, Apr. 10, 2006, pp. 209-212.

International Search Report and Written Opinion for corresponding International Application No. PCT/US2009/047736, filed Jun. 18, 2009.

AMS International, "Introduction to Aluminum-Silicon Casting Alloys," (10 pages), vol. 1; Aluminum-Silicone Casting Alloys: Atlas of Microfractographs; Materials Park, Ohio, USA. 2004.

Zhang, B., Zhao, D.Q., Pan M.X., Wang, W.H. Greer, A.L., "Amorphous Metallic Plastic", Physical Review Letters, published May 23, 2005, (4 pages) PRL 94, 205502 (2005), The American Physical Society College Park, MD, USA.

Murthy, N.S., Minor H., Akkapeddi, M.K., Van Buskirk, B., "Characterization of Polymer Blends and Alloys be Constrained Profile-Analysis of X-Ray Diffraction Scans", accepted Jan. 2, 1990, (8 pages), Journal of Applied Polymer Science, vol. 41, 2265-2272 (1990), John Wiley & Sons, Inc., USA.

* cited by examiner

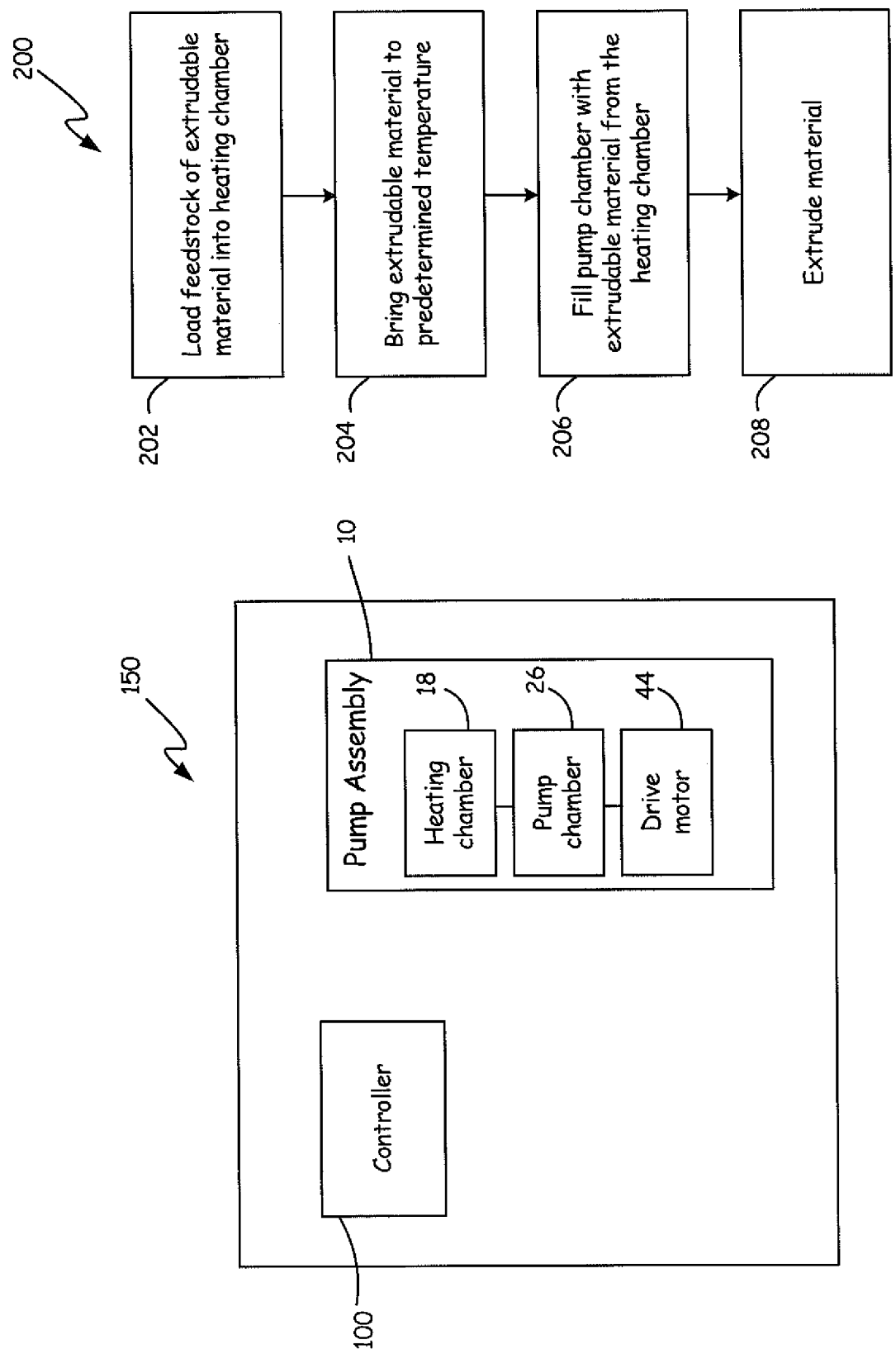

CONICAL VISCOSITY PUMP WITH AXIALLY POSITIONABLE IMPELLER AND METHOD OF PRINTING A 3D PART

CROSS REFERENCE TO RELATED APPLICATION(S)

The present application claims the benefit of U.S. Provisional Patent Application Ser. No. 62/248,972 entitled CONICAL VISCOSITY PUMP WITH AXIALLY POSITIONABLE IMPELLER filed on Oct. 30, 2015, the contents of which are incorporated herein by reference in its entirety and claims the benefit of U.S. Provisional Patent Application Ser. No. 62/248,963 entitled VISCOSITY PUMP WITH FILL AND FLOW CONTROL AND METHOD THEREOF filed on Oct. 30, 2015, the contents of which are incorporated herein by reference in its entirety.

BACKGROUND

The present disclosure relates to a viscosity pump for extruding molten materials. More specifically, the present disclosure relates to a viscosity pump having a rotatable impeller which is linearly positionable parallel to an axis of rotation within the viscosity pump. The viscosity pump may be used to extrude materials in an additive manufacturing system.

A viscosity pump may be incorporated into an extruder of the additive manufacturing system to pump a flowable material to an extrusion outlet. However, while viscosity pumps have been previously used with various types of extruders, viscosity pumps are susceptible to clogging at the extrusion outlet which may cause an unwanted variation in the flow rate of the extruded material, resulting in degradation in the quality of the printed part. Even after an impeller has stopped rotating, the viscosity pump is prone to oozing residual material from the extrusion outlet of the pump, which also may result in degradation in the quality of the part being printed. Prior disclosed viscosity pumps also lack the capability of precisely controlling the flow rate of the material. At least for the above-mentioned issues, the flow rate of the extrudable material is difficult to control with a typical viscosity pump, especially when the material has a low viscosity.

When the flowable material is a metal liquid based alloy, the metal based alloy can also cause and accumulation of material, including unwanted slag material, at the extrusion outlet of the viscosity pump, resulting in the partial clogging of the outlet. The accumulation of slag at the pump outlet adversely affects the flow rate of the material and the ability to control the flow rate of the extruded material, especially when the material is used in an additive manufacturing system.

Additive manufacturing systems are used to print or otherwise build 3D parts from digital representations of the 3D parts (e.g., STL format files) using one or more additive manufacturing techniques. Examples of commercially available additive manufacturing techniques include extrusion-based techniques, jetting, selective laser sintering, high speed sintering, powder/binder jetting, electron-beam melting, and stereolithographic processes. For each of these techniques, the digital representation of the 3D part is initially sliced into multiple horizontal layers. For each sliced layer, a tool path is then generated, which provides instructions for the particular additive manufacturing system to print the given layer.

For example, in an extrusion-based additive manufacturing system, a 3D part may be printed from a digital representation of the 3D part in a layer-by-layer manner by extruding a flowable part material. The part material is extruded through an extrusion tip or nozzle carried by a print head of the system, and is deposited as a sequence of roads on a substrate in a build plane, where the build plane is typically an x-y plane. The extruded part material fuses to previously deposited part material, and solidifies upon a reduction in temperature. The position of the print head relative to the substrate is then incremented along an axis perpendicular to the build plane, typically the z-axis, and the process is then repeated to form a 3D part resembling the digital representation.

SUMMARY

An aspect of the present disclosure relates to a viscosity pump assembly configured for extruding flowable materials where the viscosity pump includes a rotatable impeller that is also axially positionable within a pump chamber along a rotational axis of the impeller. The axial position of the impeller can be selectively adjusted before, during and/or after extrusion of the flowable material. The position of the impeller can be axially moved to adjust the size of a gap, or distance, between a distal tip-end of the impeller and a bottom surface portion of the pump chamber, in which an outlet or exit orifice is located. The position of the impeller is axially adjustable to control a flow rate of the material. The position of the impeller can be axially adjusted in one embodiment based on various system factors which include, but are not limited to, changes in a level of material over time, temperature changes in the pump chamber or physical characteristics of the extrudable material, for example, viscosity to control a flow rate of the material. The impeller distal tip-end is configured in one embodiment to have a complementary outer surface with the outlet such that a seal is formed to prevent flow from the outlet as the distal tip-end of the impeller is fully extended into the outlet.

In another aspect, the present disclosure relates to a viscosity pump assembly for use in an additive manufacturing system. The assembly includes a viscosity pump having a first end and a second end wherein the first end has a cross sectional area greater than a cross sectional area of the second end. The viscosity pump has a conical shaped inner surface defining a pump chamber, an inlet proximate the first end and an outlet proximate the second end. The viscosity pump includes an impeller having an axis of rotation, where the impeller has a shaft positioned through the first end of the first housing and into the pump chamber. The impeller includes a distal tip-end at a distal end of the shaft wherein the impeller is configured to be axially displaced within the pump chamber of the viscosity pump parallel to the axis of rotation. An actuator is coupled to a proximal end of the impeller, wherein the actuator is configured to move the impeller parallel to the axis of rotation.

Another aspect of the present disclosure relates to a pump assembly for use in an additive manufacturing system. The pump assembly includes a viscosity pump having a first end and a second end wherein the first end has a cross sectional area greater than a cross sectional area of the second end. The viscosity pump has a conical shaped inner surface extending between the first end and the second end that defines a pump chamber. The viscosity pump includes an inlet proximate the first end and an outlet proximate the second end. The viscosity pump has an impeller with an axis of rotation, where the impeller includes a shaft positioned through the first end of the first housing and into the conical shaped pump chamber. The impeller has a distal tip-end at a distal end of the shaft wherein the impeller is configured to be axially displaced within the viscosity longitudinally parallel to the axis of rotation. An actuator is coupled to a proximal end of the impeller, wherein the actuator is configured to move the impeller parallel to the axis of rotation. A level sensor is configured to sense a level of a consumable material within the pump chamber. A controller is configured to receive a signal from the sensor wherein the controller is configured to send a signal to the actuator to adjust a position of the impeller within the pump chamber based upon the sensed change in level over time.

Another aspect of the present disclosure includes a method of printing a 3D part that includes heating a consumable material to a molten state in an initial stage heating chamber, and transferring a selected amount of the molten consumable material to a pump chamber of a viscosity pump such that a level of the molten consumable material in the chamber obtains a predetermined upper level limit. The molten consumable material is extruded in a layer by layer manner based upon a sliced 3D digital model of the 3D part through rotational movement of an impeller. The method includes monitoring the change in a level in the pump chamber during the extrusion process to determine a sensed volumetric flow rate of the molten material extruded from the pump chamber and comparing the sensed volumetric flow rate to a volumetric flow rate set point to determine an error. The method further includes adjusting axial position of the impeller based upon the determined error to adjust the volumetric flow rate.

BRIEF DESCRIPTION OF THE DRAWINGS

FIG. 6 is a block diagram of the 3D printing system.

FIG. 7 is a block diagram of an additive manufacturing system according to an embodiment of the present disclosure.

DETAILED DESCRIPTION

Figure 1:
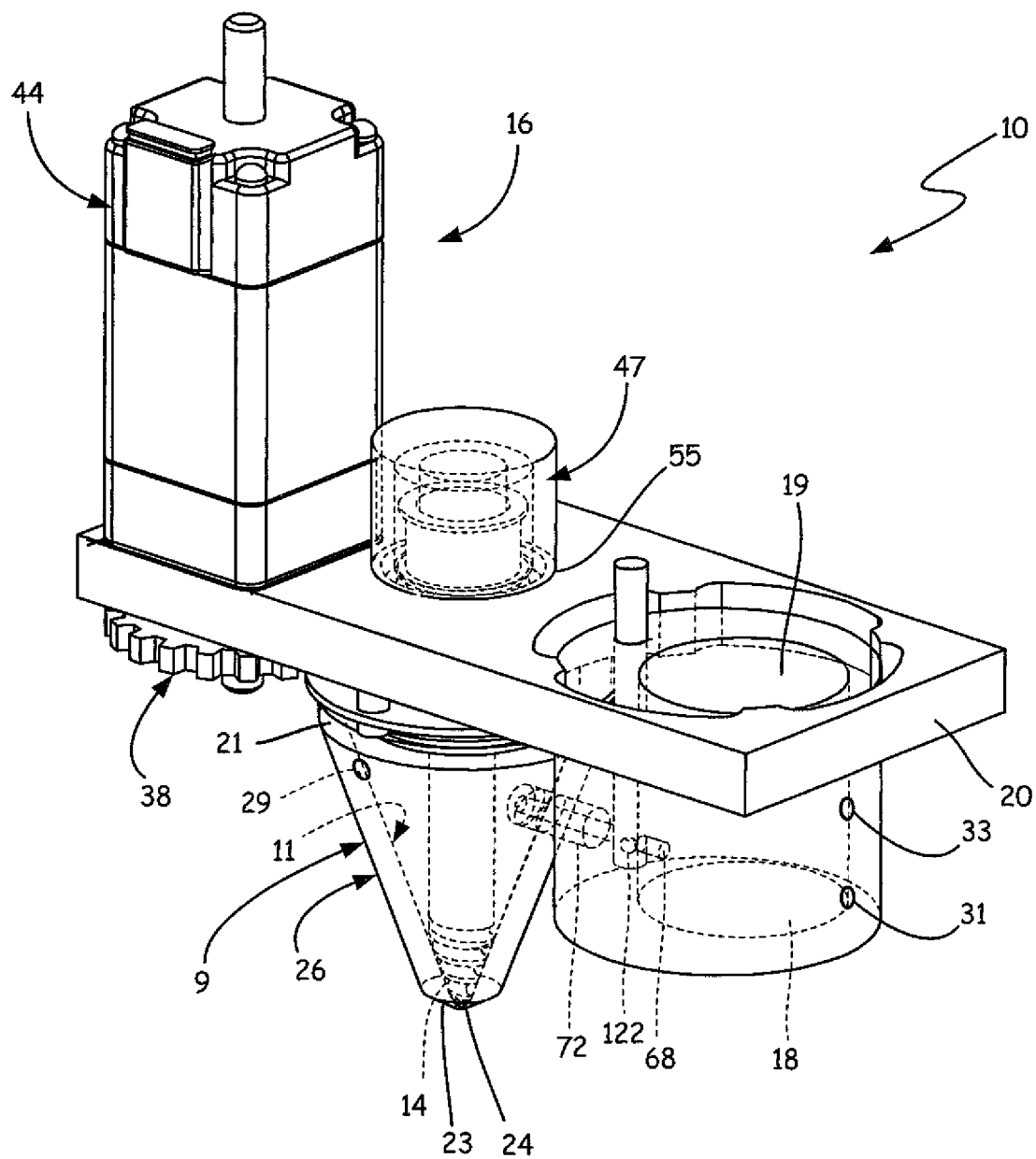
FIG. 1 is a front perspective view of a viscosity pump system of the present disclosure with a pump chamber and heating chamber being transparent for ease of illustration of internal components.
Figure 2:
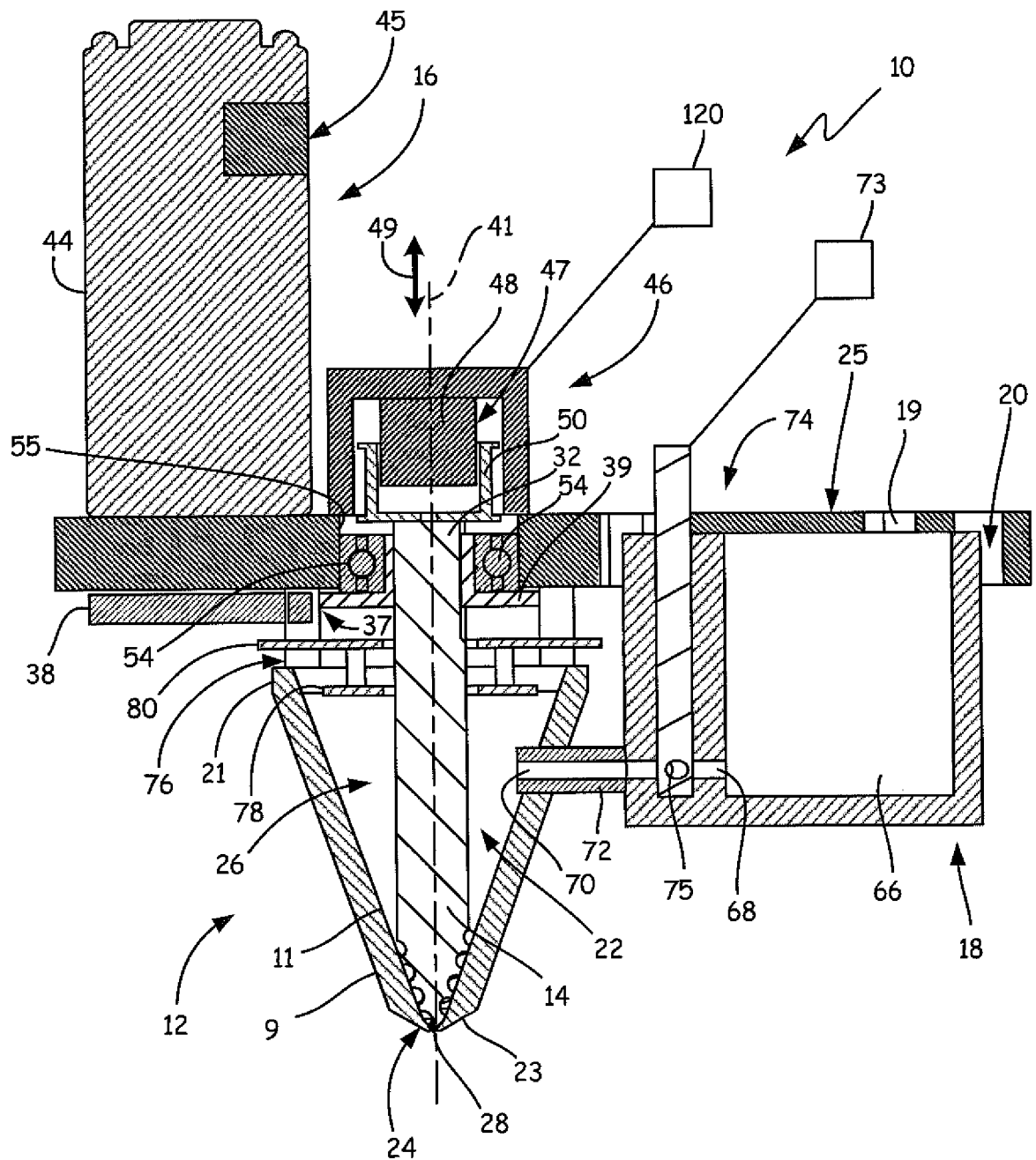
FIG. 2 is a cross-sectional front view the viscosity pump system.

A viscosity pump assembly 10 for use in an additive manufacturing system is illustrated in FIGS. 1-2. The pump assembly 10 of the present disclosure includes a viscosity pump having a pump chamber with an interior conical shaped surface leading to an extrudate outlet. The viscosity pump includes an impeller having a shaft that extends through the pump chamber and an impeller tip at a distal end of the shaft wherein the distal end is located proximate the extrudate outlet. The impeller is rotatable about an axis of rotation and is axially positionable parallel to the axis of rotation. The pump assembly further comprises a first level sensor configured to sense a level of extrudable material in the pump chamber. Additional sensor assemblies may be incorporated into the pump assembly and may be configured to control an extrusion rate of material from the pump chamber. The additional sensor assemblies may include, for example, a Z-position sensor configured to sense the axial position of the impeller and therefore a position of the impeller tip within the pump chamber; a sensor configured to sense a level of material in a heating chamber that is in fluid flow communication with the pump chamber; and one or more temperature sensors for sensing a temperature of the build material within the pump chamber and/or the heating chamber, respectively. Additionally, the pump assembly may include a power source, such as a drive motor, for a drive mechanism configured to drive the impeller with an adjustable rotational speed and in a chosen rotational direction of the impeller. The drive mechanism and power source may be controlled by a controller. The sensor assemblies are in communication with the controller and provide information for sensing, controlling and adjusting extrusion rates of material from the pump assembly.

The viscosity pump assembly 10 includes a viscosity pump 12 having an impeller 14, the interior of the viscosity pump 12 defining a pump chamber 26, and a drive assembly 16. Pump chamber 26 comprises a chamber wall 9 having an interior surface 11. The viscosity pump 12 is configured to receive a supply of flowable material for extrusion. The impeller 14 is axially positionable within the pump chamber 26 and is rotatable to cause the flowable material to be extruded from the viscosity pump 12. A drive assembly 16 is coupled to the impeller 14 is configured to rotate the impeller 14 in either a clockwise or counterclockwise direction within the viscosity pump 12 to provide positive or negative pressure, respectively, to the flowable material. The impeller 14 rotates in the selected rotational direction to control the flow of the material at an outlet 24 and aids in the starting and stopping of extrusion of material through the outlet 24.

The viscosity pump assembly 10, in one embodiment includes, an initial stage heating chamber 18 configured to receive and heat, or pre-heat, a supply of material. The material is heated within the initial stage heating chamber 18 to an elevated temperature such that the material is molten and is held at the elevated temperature. The initial stage heating chamber 18 is configured to provide the molten material to the viscosity pump 12 through a flow conduit.

In the embodiment illustrated in FIGS. 1 and 2, the pump assembly 10 components are incorporated into and/or supported on or by a base plate 20. The base plate 20 may be of a monolithic construction, formed or machined from a single piece of material, with openings and fittings corresponding to the pump assembly components as discussed in further detail throughout this disclosure. The base plate 20 is typically constructed from stainless steel. However, other materials of construction able to withstand elevated processing temperatures are also contemplated. A base plate 20 constructed from multiple pieces and/or types of material are also contemplated.

The base plate 20 is configured such that the pump assembly 10 can be mounted into various systems where a viscosity pump may be used. Examples include, but are not limited to, use in an extrusion-based additive manufacturing system wherein a 3D part is manufactured in a layer by layer manner, where each layer is formed by extruding beads of material in a raster pattern utilizing the assembly 10.

The viscosity pump 12 defines the pump chamber 26 and includes an inlet 70 proximate a top end 21 that is in fluid flow connection with the initial stage heating chamber 18 and an outlet 24 proximate a bottom end 23. The pump chamber 26 is, in one embodiment, substantially conical in shape and has a conically shaped inner surface extending between the top end 21 and the bottom end 23, where the outlet 24 is located in the bottom end 23. The conical surface has a greater cross-sectional area at the top end 21, and a smaller cross-sectional area at a bottom end 23. The outlet 24 includes an exit orifice 28, which, for example, may include an extrusion tip positioned within the outlet 24. The exit orifice 28 may also be integrally formed within the outlet 24 of the pump chamber 26. In further alternative embodiments, the exit orifice 28 may comprise an insert or threaded replaceable part configured for positioning within the outlet 24.

The pump chamber 26 is configured to receive a supply of heated material from the initial stage heating chamber 18. The pump chamber 26 may also be heated and may be configured to maintain the heated material at a selected temperature such that the heated material is maintained in an extrudable state. The pump chamber 26 is, in one embodiment, in thermal contact with a heating element 27. A corresponding temperature sensor 29 is configured in one embodiment to sense the temperature of the liquid material within the pump chamber 26. The heating element 27 may comprise any configuration of heater, examples of which may include, but are not limited to, a heating jacket or other electrical resistance heaters in thermal contact with the pump chamber 26.

The initial stage heating chamber 18 has an inlet 19 configured to accept feedstock material therein. An example of an inlet 19 is an aperture in a cover 25 wherein the aperture is configured to be sealed during heating and extrusion. The aperture may accept a conduit portion for receiving a feedstock supply for heating. Other inlet configurations, include, but are not limited to, a receptacle configured to engage a supply line or tubing and other openings may also be incorporated such that the initial stage chamber 18 is configured to receive a feedstock of supply material as needed.

The initial stage heating chamber 18 is in thermal contact with a heating element 31. A corresponding temperature sensor 33 is configured in one embodiment to sense the temperature of the supply material within the heating chamber 18. The heating element 31 may comprise any configuration of heater, examples of which may include, but are not limited, to a heating jacket or an electrical resistance heater in thermal contact with the heating chamber 18. The heating element 31 is further configured to heat the heating chamber 18 and thus heat the supply material received therein to an elevated temperature, such that the supply material is in a molten state and suitable for extrusion. The elevated temperature is typically a temperature at or above a liquidus temperature of the supply material. Thus, the viscosity pump 12 and the initial stage heating chamber 18 are configured to withstand the elevated temperatures required for maintaining the supply material in an extrudable or flowable state. In one embodiment, a feedback control loop may be used to monitor and regulate the temperatures of the initial stage heating chamber 18 and within the pump chamber 26. This feedback control loop is in one embodiment a part of a controller such as controller 100 (described elsewhere herein).

Figure 3:
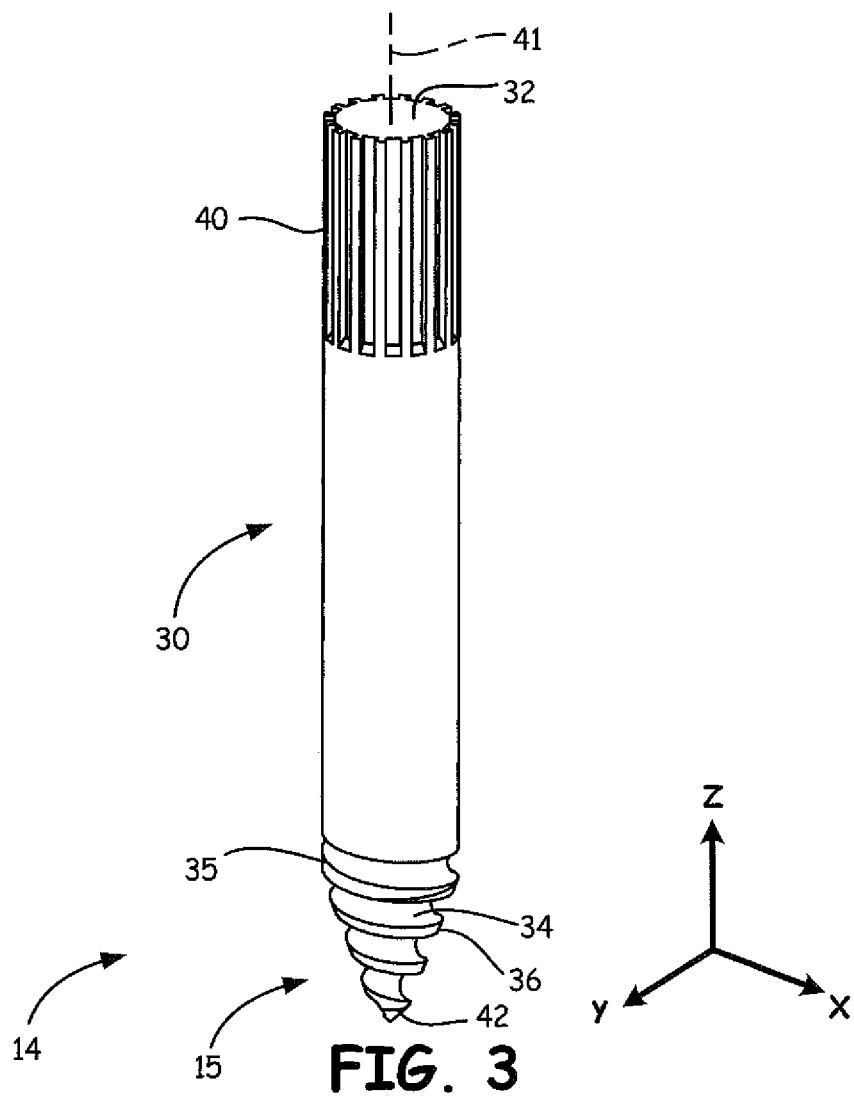
FIG. 3 is a perspective view of the impeller and shaft component of the viscosity pump system.

An exemplary impeller 14 is illustrated in further detail in FIG. 3. The impeller 14 comprises in one embodiment a substantially cylindrical shaft 30 with an impeller tip 15 positioned at a distal end 42 of the shaft 30. The impeller tip 15 may be integrally formed in the distal end 42 of the shaft 30 or may be a separate part secured to the shaft 30. The shaft 30 also has a proximal end 32 configured to engage with the drive assembly 16.

Figure 4:
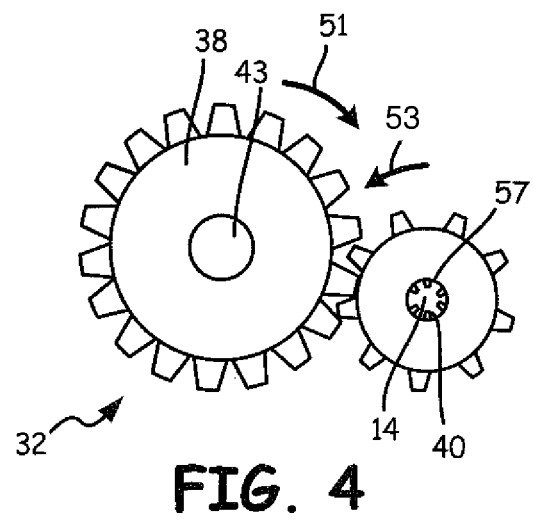
FIG. 4 is a schematic view of a drive assembly of the viscosity pump system.

Referring to FIGS. 2-4, in one embodiment, the drive assembly 16 comprises a gear assembly 37 configured to engage the proximal end 32 of the shaft 30 and thus the impeller 14 about an axis of rotation 41. The gear assembly 37 includes a drive spline gear 38, for example coupled to an output shaft 43 of the electric variable speed motor 44. The drive spline gear 38 includes outer splines that mesh with splines a follower gear 39 such that rotation of the drive spline gear 38 causes rotation of the follower spline gear 39 in the opposite rotational direction as indicated by arrows 51 and 49. The follower gear 39 includes an internal aperture 57 that is configured to engage spline teeth 40 around a circumference of the proximal end 32 of the impeller 14. The internal aperture 57 is configured such that the proximal end 32 of the shaft 30 is slidably retained therein.

The drive motor 44 may be secured to the base plate 20 and operably connected to the gear assembly 37 through the output shaft 43 such that the motor 44 powers the drive assembly 16. A power source 45, is in one embodiment, coupled to the drive motor 44. The motor 44 may be, for example, a variable speed electric motor. The impeller 14 is thus rotatable in a forward and a reverse direction based on the rotation of the drive motor 44 and is capable of generating negative or positive pressure in the pump chamber 26 via the selected rotation direction. An exemplary variably speed electric motor is a NEMA size 8 stepper motor.

The impeller 14 has a conically shaped outer surface proximate the distal end 15, which is of a substantially complementary configuration to the conical shape of the inner surface of the pump chamber 26 at the outlet 24, so as to be mateable therewith. The impeller tip 15 is configured in one embodiment with a continuous spiral or helical groove 34 defined by a continuous ridge 36 extending along at least a portion of its outer surface. The groove 34 and ridge 36 in one embodiment are configured with a logarithmic spiral. The logarithmic spiral is configured as a curve line somewhat analogous to the common logarithmic curve. The logarithmic curve intersects all its radiants at the same angle, and the tangent of this angle is the modulus of the system of logarithms which the particular spirals represent. A continuous exterior surface 35 of the ridge 36 also approximate a logarithmic spiral.

The impeller 14 is positioned in the pump assembly 10 to extend through an aperture 55 in the base plate 20 with its distal end 15 extending axially into the pump chamber 26. The proximal end 32 of the shaft 30 extends through the aperture 55 in the base plate 20, and slidably engages with the internal aperture 57 of the follower gear 39 as described previously. The impeller 14 is axially positionable along the directions of the arrow 49 parallel to the axis of rotation 41. The impeller 14 is axially moved within the pump chamber 26 to selectively adjust the size of a gap 46 between the impeller tip 15 and the outlet 24 as last illustrated in FIGS. 5A-5B.

Adjusting the size of the gap 46 allows the extrusion rate of the material from the outlet 24 to be controlled. Controlling the axial position of the impeller 14 and thus the gap 46 also allows for controlling the material flow rate based on various extrusion factors, including, but not limited to, sensed material levels over time which can be correlated to a volumetric flow rate, the physical or chemical attributes or functions of the extruded material, material viscosities, temperatures and/or considerations relating to the part being printed including whether the part being printed is the 3D part, a support, a bracing object or the selected resolution of the printed part.

The impeller tip 15 may be adapted in another embodiment to function as a needle valve such that the tip 15 is precisely complementary in configuration to the shape of the inner surface of the pump chamber 26 proximate the outlet 24. The impeller tip 15 substantially closes off and seals the exit orifice 28 when the impeller is axially positioned to extend into the outlet 24. In an alternative embodiment, the impeller 14 may also be further configured with an end-boss that is configured to protrude through the outlet 24 and into the exit orifice 28 for closing off the exit orifice 28. When the impeller tip 15 functions as a needle valve the need for an end-boss can be optionally eliminated such that the impeller tip 15 itself substantially completely seals off the exit orifice 28. The end-boss may be beneficial in some assemblies, for example, assemblies wherein the impeller 14 is configured with deeper grooves and ridges or where there is a slight space between the inner surface of the pump chamber 26 and the outer surface of the impeller 14.

A voice coil 47 is used, in one embodiment, to adjust the axial position of the impeller 14. A voice coil magnet 48 is fixed on a top surface of the base plate 20. A voice coil bobbin 50 is fixedly attached to proximal end 32 of the impeller 14 that extends through a lower surface of the base plate 20 in one embodiment. The voice coil magnet 48 interacts with the voice coil bobbin 50, which is the moving coil half of the voice coil 47. Movement of the bobbin 50 therefore moves the impeller 14 axially in the directions of the arrow 49 when the voice coil 47 is driven by a drive mechanism. In one embodiment, a control loop is used to position the impeller 14 to a known Z-position with a known spring constant. While a voice coil 47 is illustrated and described herein, other actuators are within the scope of the present disclosure.

A radial bearing 54 is further positioned within the aperture 55 in the base plate 20. The radial bearing 54 maintains alignment of the impeller 15 parallel to the axis of rotation 41, while allowing the impeller 15 to substantially freely rotate about and move parallel to the axis of rotation 41. The pump assembly 10 is further configured with a Z-position sensor assembly 120 configured to sense the axial position of the impeller 14 and may, for example, be mounted with the voice coil magnet assembly 48 or otherwise located within the pump chamber 26. The sensor 120 is also in communication with a controller 100 (as illustrated in FIG. 6) and configured to communicate a signal based on the axial position of the impeller 14 which also correlates to the size of the gap 46. Examples of the Z-position sensor 120 include, but are not limited to, a linear variable displacement transducer ("LVDT" sensor) configured to sense the axial position of the impeller 14 through the voice coil 47.

Figure 5A:
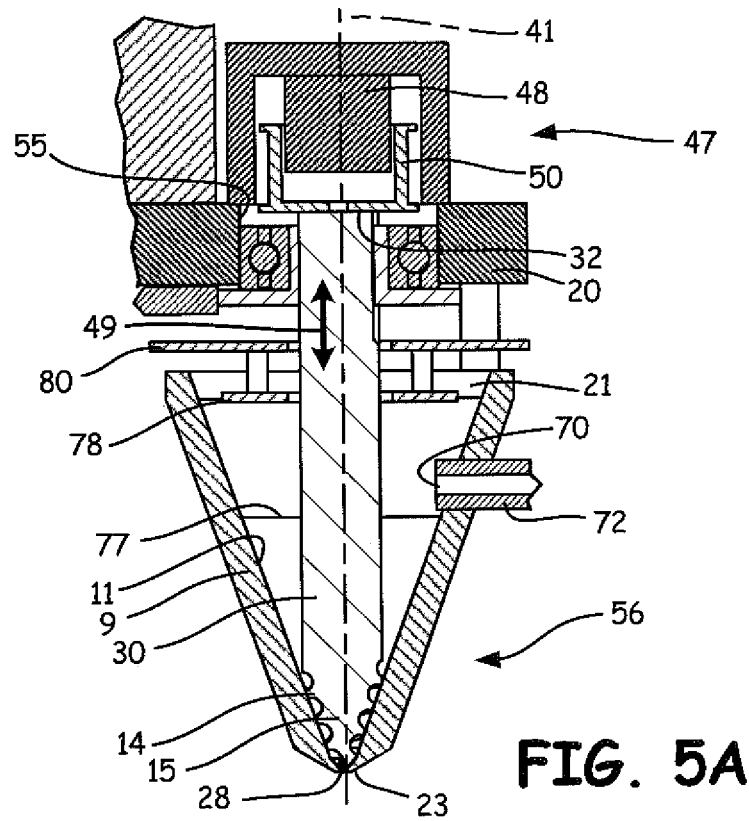
FIG. 5A is a front cross-sectional view of the housing of the viscosity pump system illustrating an impeller in an axially extended position.
Figure 5B:
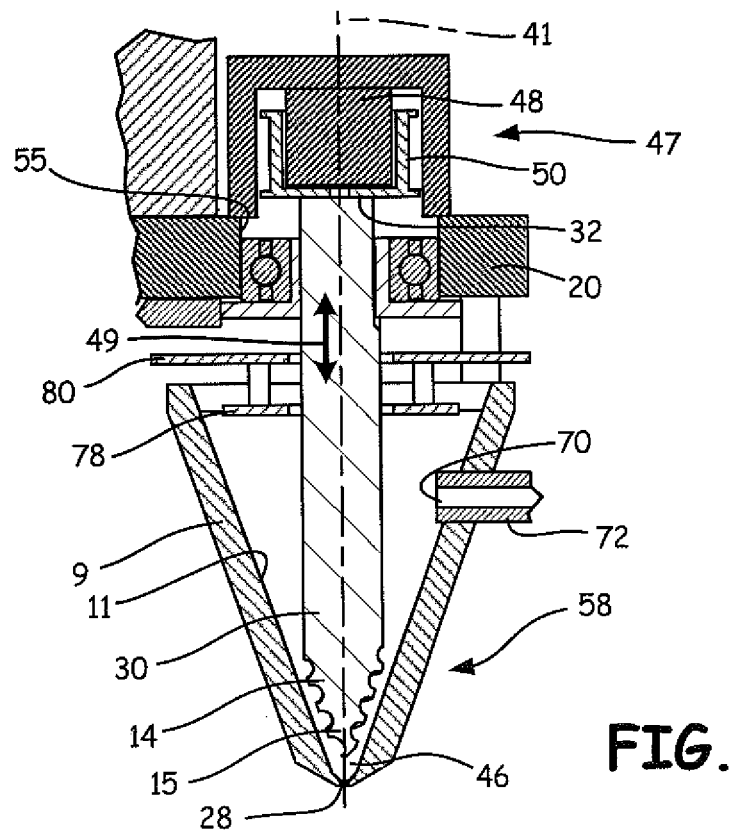
FIG. 5B is a front cross-sectional view of the housing of the viscosity pump system illustrating the impeller in an axially retracted position.

As illustrated in FIGS. 5A-5B the position of impeller 14 is axially adjustable within the pump chamber 26. The impeller 14 is movable between an extended position 56 (illustrated in FIG. 5A and a retracted position 58 (illustrated in FIG. 5B), as well as intermediate positions between the extended and retracted positions. The impeller 14 can be lowered into the pump chamber 26 to reduce the size of the gap 46 between the impeller 14 and the outlet 24 and thus alter the amount extruded per impeller revolution. Substantially eliminating the 46 35 by extending the impeller tip 15 into the outlet 24 allows the impeller 14 to substantially or completely seal off the exit orifice 28. In the fully extended position, the impeller 14 may also act to mechanically unclog the exit orifice 28 by forcing any accumulated extrudable material that has cooled or gathered near or in the exit orifice 28 out of the exit orifice 28. In the extended position 56 illustrated in FIG. 5A, the impeller 14 is near to or in contact with the exit orifice 28, and the sides of the impeller 14 are sufficiently close to or in contact with the inner surface of the outlet 24, such that extrusion is prevented.

The retracted position 58 of the impeller 14 opens the outlet 24 and increases the size of the gap 46 and thus increases the extrudate flow rate. In one embodiment, the position of the impeller 14 is axially adjusted to position the distal end 15 at various set points to change the size of the gap 46 between the outlet 24 and the impeller 14. Changing the size of the gap 46 changes the flow rate of the heated material in the pump chamber 26 extruded through the outlet 24 and the exit orifice 28 to substantially match a extrusion rate set point. The size of the gap 46 may be selected based in part on material viscosity, temperature or other extrusion parameters. The gap distance 46 is selectively controlled and can be increased and/or decreased on demand (e.g. during extrusion or just before or after a pause in extrusion) for extrusion rate control. The gap distance 46 can be sensed by the sensor 120 and adjusted accordingly with respect to the state of the extrudable material, selected flow rate, sensed volumetric flow rate, temperature changes and/or wear of the pump components based on the axial position of the impeller as provided by the Z-position sensor 120.

Figure 5C:
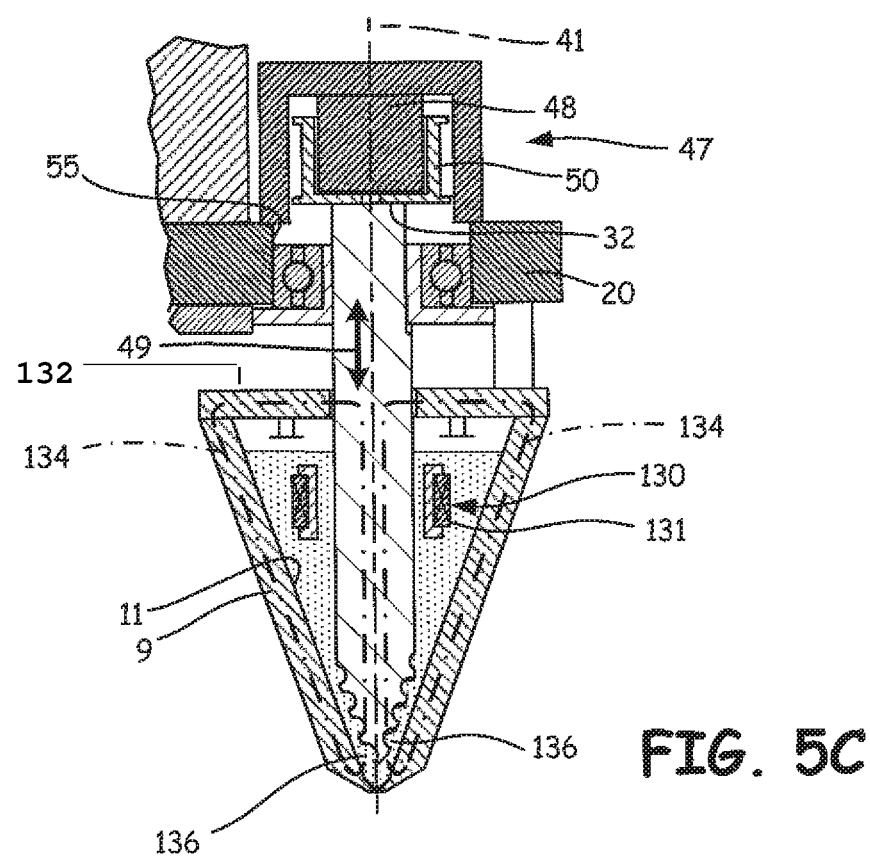
FIG. 5C is a front cross-sectional view of the housing of the viscosity pump system according to another embodiment of the present disclosure.
Figure 8:
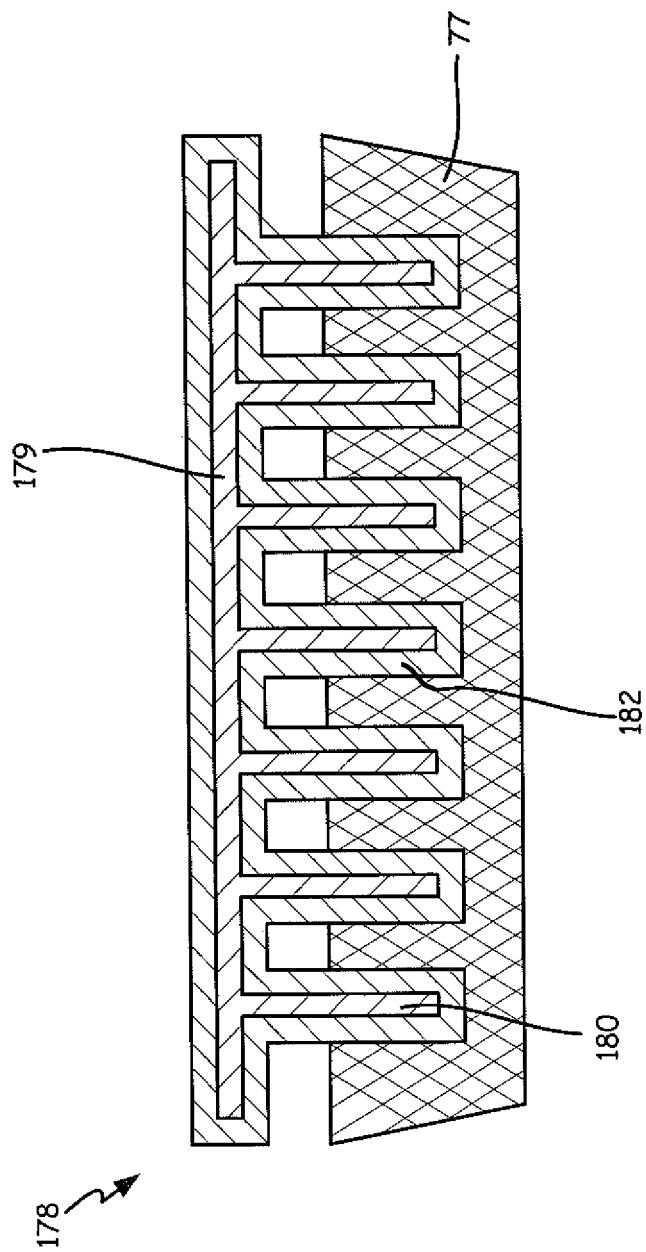
FIG. 8 is a sectional view of a sensor.

In another embodiment, illustrated in FIG. 5C, a second bobbin 130 with windings 131 around it is provided in the pump chamber 26, such that the impeller 14 passes through the bobbin 130. A metallic plate 132, such as a plate of iron, is positioned above the bobbin 130 and also around the impeller 14. A magnetic field generated by the coils 131 of bobbin 130 creates a magnetic circuit comprising the impeller 14, the plate 132, and the wall 9 of the pump 12. Magnetic field lines 134 of the magnetic circuits created by the coils 131 of the bobbin 130 are shown as dashed lines in FIG. 5C. The region 136 of alloy near the screw of the impeller 14 that is in close proximity to the inner surface 11 of the wall 9 of the pump 12 has induced eddy currents, increasing the effective viscosity of the alloy in the gap between the impeller 14 and the wall 9 of the pump 12. The increased viscosity improves pumping of pump 12. Bobbin 130 and plate 132 are mounted within the pump chamber 26 in conventional fashion.

Referring back to FIGS. 1-2, in one embodiment the initial stage heating chamber 18 includes a chamber configured to receive a feedstock of material, which may be in a solid state and of arbitrary configuration. The initial stage heating chamber 18 is configured to heat the supply of material to an elevated temperature such that the material becomes molten, or otherwise heated to a flowable state for extrusion. In another embodiment, the feedstock material may be received in the initial stagFIGe heating chamber 18 in a molten state, where the initial stage heating chamber 18 is configured to maintain the feedstock material in the molten state. The initial stage heating chamber 18 comprises, in one embodiment, interior region 66, one or more heating elements 31, configured to provide a selected thermal profile to the heating chamber 18 and a sensor 33 to monitor the temperature of the material, all of which are in communication with the controller 100, as illustrated in FIG. 6.

The initial stage heating chamber 18 has an outlet 68 positioned near a lower portion of the initial stage heating chamber 18. The initial stage heating chamber 18 is fluidly connected to the inlet 70 positioned near the upper end 21 of the pump chamber 26 with a conduit 72. In one embodiment, the pump assembly 10 is arranged on and secured to the base plate 20 such that the heating chamber 18 is substantially positioned at a level above the pump chamber 26. The outlet 68 of the initial stage heating chamber 18 is thus preferably positioned near the bottom of the heating chamber 18. This positioning reduces the volume of dead flow regions, such as at the bottom of the heating chamber 18, for reducing a purge volume required to change the materials heated in the heating chamber 18. Further, as slag and oxides tend to accumulate at the top of the molten material in the initial stage heating chamber 18, locating the outlet 68 lower in the initial stage heating chamber 18 assists in the prevention of transferring slag into the pump chamber 26. Slag and oxides may be skimmed off, or allowed to cool and be machined out of the initial stage heating chamber 18, or the chamber 18 may occasionally be replaced.

The initial stage heating chamber 18 has a minimum fill level that is in one embodiment at least at or preferably above the outlet 68. The outlet 68 is positioned substantially level with the inlet 70 of the pump chamber 26, thus the interior region 66 of the initial stage heating chamber 18 and the volume of the pre-heated material is held generally above the inlet 70 of the pump chamber 26. This arrangement also allows head pressure in the heating chamber 18 and gravitational forces to be utilized to cause flow of heated material from the initial stage heating chamber 18 to the pump chamber 26.

High viscosity extrudates may not flow from the heating chamber 18 to the pump chamber 26 simply through gravity feed. In such situations, pressure may be applied to the material, and/or the size of the flow conduit 72 between the heating chamber 18 and the pump chamber 26 may be increased, to assist in extrudate transfer from the heating chamber 18 to the pump chamber 26. In one embodiment, the flow is controlled with a control valve as will be discussed further below. The inlet 70 is preferably positioned near the top end 21 of the pump chamber 26 so as to allow for filling of the chamber 26 with extrudable material so as to allow material to flow therein without back pressure.

The flow through the flow conduit 72 is controlled in one embodiment by a valve assembly 74. The valve assembly 74 includes in one embodiment a valve 75 configured to move between open and closed positions for allowing and preventing material flow. The valve assembly 74 may comprise, for example, a quarter turn rotating valve 75. The valve 75 is positioned either proximate the outlet 68 or at a location within the flow conduit 72. The valve 75 is movable between a first, open position, which allows the heated material in the initial stage heating chamber 18 to flow into the pump chamber 26 via inlet 70 and a second, closed position, which stops or pauses the flow of the heated material from the heating chamber 18 to the pump chamber 26. In one embodiment, a valve actuator 73 is provided and configured for rotating the valve 75 in response to a signal received from the controller 100, as illustrated in FIG. 6, in response to either a sensed pump chamber 26 fill level or heating chamber 18 fill level.

The controller 100 may be a closed loop controller in a wired or a wireless connection with the pump assembly 10 and its components. Various sensor assemblies may be integrated into the pump assembly 10. Examples of sensors include but are not limited to a position sensor 120 integrated into the pump chamber 26 to monitor the Z-position of the impeller 14; a sensor assembly integrated into the heating chamber 18 and configured to monitor the level of pre-heated material in the heating chamber 18, and a sensor assembly configured to monitor the level of extrudable material in the pump chamber 26. Further, the controller 100, as illustrated in FIG. 6, may be configured to calibrate the sensor assemblies to compensate to account for a measurement change associated with the reciprocal movement of the axial motion of the impeller 14.

In one embodiment of the pump assembly 10, a sensor assembly 76 configured to monitor the level of extrudable material in the pump chamber 26 is positioned within the pump chamber 26. In this embodiment, the extrudable material comprises a metal-based alloy. The fill level, or level of extrudable material, in the pump chamber 26 can be continuously sensed and monitored by the sensor assembly 76. The sensor assembly 76 may, for example, comprise a capacitive sensor assembly configured to sense the level of the metal-based alloy in the pump chamber 26 as the level changes due to extrusion from and/or filling of the pump chamber 26. Metal-based alloy materials are generally conductive and thus, capacitance between a surface level 77 (See FIG. 5A) of the metal-based alloy and a conductive electrode 78 can be sensed. Changes in capacitance may be sensed by the capacitive sensor assembly 76, and communicate to controller 100. The sensed capacitance is in one embodiment correlated with the level 77 of heated metal-based alloy within the pump chamber 26. When the configuration of the pump chamber 26 is known, a change in the level 77 over a period of time, can be correlated to a volumetric extrudate flow rate.

In one embodiment, the electrode 78 may be a circular disk assembly positioned near the top end 21 of the pump chamber 26. The electrode 78 is adapted with an aperture allowing the electrode 78 to be positioned about the shaft 30 near the top end 32 of the impeller 14. The electrode 78 is secured to either a cover 80 for the pump chamber 26 or secured to the base plate 20, such that the electrode 78 is in a fixed position over the internal cavity of the pump chamber 26. As the surface level 77 of the extrudable material rises or falls, the capacitance changes respectively as the distance between the electrode 78 and the surface level 77 of the extrudable material changes. As the capacitance changes, one or more signals are sent to the controller 100 indicating the level, as the sensed capacitance is compared to known capacitances that are correlated to known levels.

Threshold capacitances or a range of capacitances indicating a low extrudable material fill level causes the controller 100 to send a signal to open the valve 75 to fill the pump chamber 26. When a sufficiently high fill level 77 is sensed, the controller 100 to cause the valve 75 to close. Material levels 77 between a substantially full pump chamber 26 and a substantially empty pump chamber 26 can also be determined by changes in sensed capacitances. The capacitance can be continuously sensed, allowing any change in pump chamber 26 material level to be sensed in real-time, and thus knowingly the volume of the pump chamber 26 allows for a determination of extrudate flow rate in real-time.

Variations from a selected volumetric flow rate can be controlled adjusting a z-position of the impeller 15 or manipulating the speed of rotation by the impeller or combinations of two or more variables. Thus, the extrudate flow rate from viscosity pump assembly 10 can be controlled in real-time.

The capacitance feedback control provides various advantages to the viscosity pump assembly 10 of the present disclosure. Capacitance is determined form the following equation:

$$C_o = \frac{\epsilon_o \in A}{d} \quad \text{(Equation 1)}$$

Where $C_o$ measured capacitance in Farads, $\epsilon_o$ is the permativity of a free space, A is the area of the electrode and d is the distance from the electrode to the surface of the material. By way of example, the electrode 78 can be a 1.2" diameter disk, and it is fixed approximately 0.2" above a pre-determined upper limit of a top surface of an aluminum alloy. The electrode 78 is fixedly secured to the base plate 20, or alternatively to an inner surface of the pump chamber 26. Calibrating the sensor assembly 76 includes determining the relative capacitance between the metal-based alloy selected for extrusion and the electrode 78 which can be illustrated by the following equation:

$$C_o = \frac{\epsilon_o \in \pi (1.2 \text{ in})^2}{4(0.2 \text{ in})} \sim 3.3 \text{ pF} \quad \text{(Equation 2)}$$

A change in level is determined from the following equation.

$$dz = \frac{dv}{A} \quad \text{(Equation 3)}$$

where dz is the change in level, dv is the change in volume and A is a cross-sectional area of a vessel.

For example, if the diameter of the heating chamber is approximately 0.95" and 1 micro-cubic-inch ("mic") of extrudable material is removed from the heating chamber 18 and directed to the pump chamber 26, the level of the surface in the heating chamber 18 drops on average by 36 nm as illustrated by the following equation:

$$dz = \frac{4 10^{-6} \text{ in}^2}{\pi (0.95 \text{ in})^2} = 36 \text{ nm} \quad \text{(Equation 4)}$$

Thus, the change in capacitance when the 1 mic is removed is illustrated by the following equation:

$$C_o \left( \frac{36 \text{ nm}}{0.2 \text{ in}} \right) = 23 \text{ aF} \quad \text{(Equation 5)}$$

where an aF (atto Farad) is $10^{-18}$ Farads. The change can be measured based on the measured aF, which is perceptible by, for example, a device such as an AD7746 chip manufactured by Analog Devices, Inc. located in Norwood, Mass. The AD7746 chip is capable of reading out 4 aF changes in an 11 Hz bandwidth. The noise floor rises roughly as the square root of the bandwidth, such that the 1 mic volume change appears detectable in a $$11 \text{ Hz} \left( \frac{23 \text{ aF}}{4 \text{ aF}} \right)^2 = 360 \text{ Hz}$$

bandwidth. Thus material level can be monitored in real time when applied to the electrode and fill level in the pump chamber 26. While the equations provided herein are for a cylindrical geometry for the initial stage heating chamber 18, the same analysis can be used with the geometry of a right cone configuration where the variables related to a right cone are analyzed.

The electrode 78 may also be configured to be "slosh resistant." Heated metal-based alloys generally have a low viscosity and result in "watery" extrudable materials. The heated metal-based alloy extrudable materials could slosh, or splash in the pump chamber 26 during filling and when the pump chamber 26 is laterally accelerated and decelerated, as is the case when printing a layer in a raster pattern. This disruption of the extrudable material in the pump chamber 26 may be reduced by moving a part that is being built as opposed to moving the pump assembly 10, for example, with a pump assembly such as assembly 10 built into an additive manufacturing system where the 3D printed part is moved in the x-y plane during layer by layer building of the part (e.g. the part is moved in the x-y plane during building via a gantry).

Referring to FIG. 5, in another embodiment, to reduce or eliminate any potential sloshing, an electrode 178 may be configured with multiple, spaced apart insulated sensing plates 180 to protect the electrode 178 from contact with the extrudable material. In one embodiment, the plates 180 are covered with an insulating layer 182 and extend substantially perpendicular to an electrode body 179, and into the molten material. In this embodiment, the plates 180 act as baffles to reduce sloshing of the molten material within the pump chamber 26. Thus, disruptions in the surface level of the extrudate are minimized and do not negatively affect the capacitance measurements indicative of the level of molten material within the pump chamber 26.

Additional control loops are used in other embodiments, in combination or individually, to compensate for capacitance data sensed by the capacitive sensor assembly 76 caused by a change in the level of the material, to measure and set the Z-position of the impeller 14 with the voice coil 47 so that a flow rate desired through the extruder 10 matches a measured extrusion rate from the pump chamber 26. A high-level control loop can be utilized that determines when the valve assembly 74 may be opened to refill the pump chamber 26 without affecting extrusion flow. A transient control loop can be utilized to adjust start-up and shut-off sequences for axial and rotational motion of the impeller 14 to control the extrudate flow rate in response to the sensed capacitance, for example. Such control loops may be embodied within and operated by the controller 100 in one embodiment.

In a further embodiment of the pump assembly 10, the pump assembly 10 is incorporated into an additive manufacturing system for printing 3D parts and corresponding support structures. Suitable additive manufacturing systems for the viscosity pump assembly described herein include extrusion-based systems developed by Stratasys, Inc., Eden Prairie, Minn. under the trademark "FDM". The system may print 3D parts and support structures from the part and support materials of consumable assemblies, using a layer-based, additive manufacturing technique. The system may also include a host computer and controller 100, where the host computer is preferably a computer-based system that interacts with the pump assembly 10 and the additive manufacturing system via the controller to heat and extrude material for building 3D objects and corresponding support structures. For example, the controller 100 may comprise one or more control circuits configured to monitor and operate the components of the pump assembly 10 and the additive manufacturing system, including the sensor assemblies. Suitable additive manufacturing systems include extrusion-based systems developed by Stratasys, Inc., Eden Prairie, Minn. under the trademark "FDM".

In operation, the pump system 10 is configured to receive one or more signals from the controller 100. One or more signals may be sent to the pump system 10 based on one or more readings or measurements from any one or a combination of the impeller Z-position sensor 120, temperature sensors 29 (for pump chamber 26) and 33 (for heating chamber 18), level sensor assembly 76 (for pump chamber 26) and 122 (for heating chamber 26), and the speed of the drive motor 44 as described throughout this disclosure. The various sensors described throughout this disclosure may comprise any type of sensor or arrangement of sensing components such that various sensors may be incorporated into the pump system 10 as configured to sense position, level and/or temperature.

FIG. 6 is a block diagram of one embodiment of an additive manufacturing system 150. System 150 includes the pump assembly 10 such as described herein, and a controller 100 operatively coupled to the pump assembly 10 to control operation thereof. As is described herein, pump assembly 10 may comprises in one embodiment a heating chamber 18, a pump chamber 26, and a drive motor 44. The heating chamber 18 is configured to melt an extrudable material, supply the melted material from the heating chamber 18 to the pump chamber 26 through the conduit, and extrude the melted material from the pump chamber 26. In various configurations, sensor assemblies such as temperature and level sensors, as well as a capacitance sensor (for sensing the levels in the heating chamber and the pump chamber 26) and drive motor controllers, communicate with controller 100, and operation and reading of the sensors and other components is controlled by the controller 100. While controller 100 is shown as a part of additive manufacturing system 150 separate from pump assembly 10, it should be understood that controller 100 may be configured as a part of pump assembly 10 without departing from the scope of the disclosure, or may be separate from the physical components of additive manufacturing system 150, and coupled thereto via any suitable communication media, including but not limited to wired and wireless connections.

FIG. 7 is a flow chart diagram of a method 200 for controlling a rate of extrusion (also referred to as flow rate) of a molten material with a pump system such as pump system 10 described herein. Method 200 comprises in one embodiment loading a feedstock of extrudable material into a heating chamber in block 202, bringing the supply of extrudable material to a predetermined temperature, in one embodiment melting, in block 204, filling a pump chamber with extrudable material from the heating chamber in block 206, and extruding the material in block 208. Before loading feedstock into the heating chamber 18, a valve (such as valve assembly 74) in a passage (such as feed conduit 72) between the heating chamber 18 and the pump chamber 26 is closed. Filling 206 the pump chamber 26 comprises in one embodiment opening the conduit 72 between the heating chamber 18 and the pump chamber 26, for example using the valve assembly 74, which allows gravity-fed flow of melted material from the heating chamber 18 to the pump chamber 26. A level of material in the pump chamber 26 is monitored in one embodiment by one or more sensors, such as capacitive sensor 76. Extruding 208 in one embodiment comprises axially positioning the impeller 14 and rotating an impeller at a selected rotational rate (such as impeller 14) to extrude material through an outlet (such as outlet 24) of the pump chamber 26. A flow rate for the extrusion is set in one embodiment using the voice coil 47 to set the axial position of the impeller 14 and the rotational rate of the impeller 14 by the drive motor 44 is set by the controller. The extrusion rate may be monitored in one embodiment based on received signals from the capacitive sensor 76. The sensed capacitance over time is correlated to a volumetric flow rate, when the volume of the pump chamber 26 is known. The flow rate is adjusted to a set point whether by changing the Z-position of the impeller 14, the rotational rate of the impeller 14, or combinations thereof.

The sensed temperature by sensor 29 and/or 33 are indicative of viscosity of the extrudate. The change in Z-position and/or rotational rate of the impeller 14 can also be manipulated to accommodate changes in viscosity. In one embodiment, the pump chamber is only filled when there is no extrusion taking place, so as to avoid affecting the flow rate. The order of performance of operations illustrated in FIG. 6 may be completed or repeated in any order or fashion, as determined by the controller 100 in one embodiment. Moreover, these steps may be completed based on interpretation of signals received from any one of the sensors or sensor systems described throughout this disclosure.

One or more of the control functions performed by the controller 100 can be implemented in hardware, software, firmware, and/or the like, or a combination thereof. The controller 100 may communicate over one or more wired or wireless communication line(s) with the heating mechanisms, impeller drive assembly, extrusion head, motor, and various temperature and fill level sensors, calibration devices, display devices, and/or user input devices as described previously throughout this disclosure.

As discussed above, the pump assembly 10 provides a suitable extrusion system for use as an extrusion head in an extrusion-based layered manufacturing system such as system 150. Examples of beneficial properties of the pump system 10 include an ability to seal off the extrusion tip and to mechanically remove and prevent clogging of the extrusion tip, adjustment of the pump to counter act wear and tear on the impeller and pump component, fast and consistent response times, real-time monitoring of extrusion rates and feed supplies, depositional viscous materials (e.g. as low as 10 poise or less) including metal-based alloys with increased flow control, reduction in the number of components needing replacement when materials are changed and amount of purge material required, reduction in the cost of feed stock materials, reduction in the pump fabrication costs, and operation at high temperature to pump high temperature materials (e.g., above 400° C.).

Although the viscosity pump of the present disclosure has been described with reference to the embodiments shown in the figures, it should be understood that the pump of the present disclosure may be embodied in many alternative embodiments and the pump assembly may comprise one or more, including some or all of the features described above. It should also be understood that any suitable size, shape or type of members or materials could be used as further understood from the description above.

While the present disclosure is directed to an extruder design for low viscosity metals, the present disclosure is not limited to the extrusion of low viscosity metals. The present disclosure can also be utilized with dielectric materials, such as engineering plastics, and in particular, dielectrics filled with particulate or short filament filler can be extruded with the disclosed viscosity pump where the disclosed viscosity pump has some advantages over long cylindrical barrel extruders or gear pumps. The viscosity pump of the present disclosure can also be used to extrude high viscosity metals such as bulk metallic glasses or peritectic alloys.

Although the present disclosure has been described with reference to preferred embodiments, workers skilled in the art will recognize that changes may be made in form and detail without departing from the spirit and scope of the disclosure.

The invention claimed is:

1. A pump assembly for use in an additive manufacturing system, the pump assembly comprising:
 a viscosity pump having a pump housing having a first end and a second end wherein the first end has a cross sectional area greater than a cross sectional area of the second end and a conical shaped inner surface extending therebetween and defining a pump chamber, an inlet proximate the first end and an outlet proximate the second end, wherein the outlet comprises a conical configuration and includes an exit orifice configured to extrude a consumable material;
 an impeller having an axis of rotation, the impeller comprising a shaft positioned through the first end of the pump housing and into the conical shaped chamber wherein the impeller comprises a distal tip-end at a distal end of the shaft wherein the impeller is configured to be rotated about the axis of rotation and moved along the axis of rotation within the pump housing, wherein the impeller distal tip-end comprises a logarithmic spiral and has a conical surface having a complementary configuration to the conical outlet of the viscosity pump such that the impeller is configured to mate with the conical outlet to provide a seal between the conical surface and the conical outlet; and
 an actuator coupled to a proximal end of the impeller, wherein the actuator is configured to rotate the impeller parallel about the axis of rotation, wherein the actuator is configured to extend and retract the impeller along the axis of rotation to adjust the size of a gap between the distal end of the impeller and the inner surface of the pump housing to control the flow of an extrudable material through the outlet within the pump housing, wherein the actuator is configured to change a distance between the distal tip-end of the impeller and the outlet of the viscosity pump as a part is being printed such that a rate of rotation of the impeller about the axis of the rotation along with a change in the distance between the distal tip-end of the impeller and the outlet of the viscosity pump are utilized to control a volumetric flow rate of the consumable material.

2. The pump assembly of claim 1, and further comprising:
 a drive assembly, the drive assembly comprising a motor; and
 a gear assembly configured to operably couple to the motor and the shaft of the impeller wherein the gear assembly is configured to rotate the shaft.

3. The pump assembly of claim 1, wherein the actuator comprises a voice coil.

4. The pump assembly of claim 3, wherein the voice coil comprises:
 a magnet fixedly secured to the pump assembly; and
 a bobbin fixedly attached to the proximal end of the impeller.

5. The pump assembly of claim 1 and further comprising:
 a fluid conduit having one end coupled to an inlet of the pump housing; and
 a heating chamber having an outlet fluidly coupled to another end of the fluid conduit such that the viscosity pump and the heating chamber are fluidly coupled and wherein the heating chamber is configured to receive a supply of consumable material where the heating chamber is further configured to heat the consumable material to an extrudable state.

6. The pump assembly of claim 5, and further comprising a valve assembly positioned in the fluid conduit between the viscosity pump and the heating chamber wherein the valve is configured to control the flow of heated material from the heating chamber to the viscosity pump.

7. The pump assembly of claim 5, and further comprising a base plate configured to support the viscosity pump and the heating chamber.

8. The pump assembly of claim 1 and further comprising a sensor configured to sense a position of the impeller within the pump chamber such that a gap between the impeller and a surface defining the pump chamber can be sensed.

9. The pump assembly of claim 8, wherein the sensor comprises a capacitance sensor.

10. The pump assembly of claim 9 and wherein the capacitance sensor comprises:
 an electrode configured to be positioned about the impeller and positioned at least partially within the pump chamber.

11. The pump assembly of claim 10 and further comprising a plurality of spaced apart baffles extending from the electrode wherein the plurality of spaced apart baffles are configured to engage the consumable material.

12. The pump assembly of claim 1, further comprising:
 a second bobbin with windings arranged in the pump chamber such that the impeller is configured to pass through the second bobbin; and
 a metallic plate positioned above the second bobbin and around the impeller;
 wherein a magnetic field generated by the windings of the second bobbin is configured to create a magnetic circuit.

13. A pump assembly for use in an additive manufacturing system, the pump assembly comprising:
 a viscosity pump having a pump chamber with a first end and a second end wherein the first end has a cross sectional area greater than a cross sectional area of the second end and a conical shaped inner surface extending therebetween and defining a pump chamber, an inlet proximate the first end and a conical outlet proximate the second end;
 an impeller having an axis of rotation, the impeller comprising a shaft positioned through the first end of the pump housing and into the conical shaped chamber wherein the impeller comprises a distal tip-end at a distal end of the shaft wherein the impeller is configured to be displaced along the axis of rotation within the pump chamber and rotate about the axis of rotation to control a volumetric flow rate of the consumable material, wherein the impeller distal tip-end comprises a logarithmic spiral and has a conical surface having a complementary configuration to the conical outlet of the viscosity pump such that the impeller is configured to mate with the outlet to provide a seal between the conical surface and the conical outlet;

an actuator coupled to a proximal end of the impeller, wherein the actuator is configured to move the impeller along the axis of rotation and change a distance between the distal tip-end and the outlet as a part is being printed;

a level sensor configured to sense a level of a consumable material within the pump chamber; and a controller configured to receive a signal from the level sensor wherein the controller is configured to send a signal to the actuator to move the impeller within the pump chamber along the axis of rotation to selected locations and adjust a rate of rotation about the axis of rotation to control a volumetric flow rate of material from the outlet based upon the sensed change in level over time.

14. The pump assembly of claim 13, and further comprising:

a drive assembly, the drive assembly comprising a motor; and a gear assembly configured to operably couple to the motor and the shaft of the impeller wherein the gear assembly is configured to rotate the shaft at the selected rate of rotation.

15. The pump assembly of claim 13, wherein the actuator comprises a voice coil.

16. The pump assembly of claim 15, wherein the voice coil comprises:

a magnet fixedly secured to the pump assembly; and a bobbin fixedly attached to the proximal end of the impeller.

17. The pump assembly of claim 13 and further comprising a position sensor configured to sense a position of the impeller within the pump chamber such that a gap between the distal tip-end of the impeller and a surface defining the conical shaped inner surface of the pump chamber can be sensed.

18. The pump assembly of claim 13, wherein the level sensor comprises a capacitance sensor.

* * * * *